US012564898B2

(12) United States Patent
Ahner et al.

(10) Patent No.: US 12,564,898 B2
(45) Date of Patent: Mar. 3, 2026

(54) STRUCTURED DISCRETE BEAM FORMATION FOR CUTTING TRANSPARENT SUBSTRATES

(71) Applicant: Seagate Technology LLC, Freemont, CA (US)

(72) Inventors: Joachim Ahner, Livermore, CA (US); David Tung, Livermore, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 1073 days.

(21) Appl. No.: 17/556,655

(22) Filed: Dec. 20, 2021

(65) Prior Publication Data

US 2022/0193821 A1 Jun. 23, 2022

Related U.S. Application Data

(60) Provisional application No. 63/128,614, filed on Dec. 21, 2020.

(51) Int. Cl.
*B23K 26/0622* (2014.01)
*B23K 26/06* (2014.01)
(Continued)

(52) U.S. Cl.
CPC ...... *B23K 26/0624* (2015.10); *B23K 26/0648* (2013.01); *B23K 26/0676* (2013.01);
(Continued)

(58) Field of Classification Search
CPC .... B23K 26/55; B23K 26/53; B23K 26/0624; B23K 26/0622; B23K 26/067;
(Continued)

(56) References Cited

U.S. PATENT DOCUMENTS 9,296,066 B2 * 3/2016 Hosseini ............. C03B 33/0222
9,815,730 B2 11/2017 Marjanovic et al.
(Continued)

FOREIGN PATENT DOCUMENTS

JP 2020004889 A * 1/2020 ........ C03B 33/0222

OTHER PUBLICATIONS

Flamm et al. "Beam shaping for ultrafast materials processing," Proc. SPIE 10904, Laser Resonators, Microresonators, and Beam Control XXI, 109041G [online]; Mar. 4, 2019 [retrieved Jan. 22, 2025]. Retrieved from the Internet: <URL: https://doi.org/10.1117/12.2511516>.*

*Primary Examiner* — Vy T Nguyen
(74) *Attorney, Agent, or Firm* — HOLZER PATEL DRENNAN

(57) ABSTRACT

A method includes emitting an ultra-short pulse laser beam from a laser source. The method also includes forming the laser beam into a plurality of discrete beams via an optical array, where intersecting discrete beams form a structured light pattern comprising a plurality of voxels. A first subset of the plurality of voxels defining a line and a second subset of the plurality of voxels lie outside the line. The method also includes forming a plurality of voids in a substrate by aligning the structured light pattern onto the substrate, each voxel of the plurality of voxels forming a discrete void in the substrate, each void separated by the substrate. The method includes, after forming the plurality of voids in the substrate at a plurality of different positions, forming an article by separating one portion of the substrate from a base portion of the substrate.

16 Claims, 6 Drawing Sheets

(51) Int. Cl.

| | | |
|---|---|---|
| *B23K 26/064* | (2014.01) | |
| *B23K 26/067* | (2006.01) | |
| *B23K 26/53* | (2014.01) | |
| *B23K 26/55* | (2014.01) | |
| *B23K 103/00* | (2006.01) | |

(52) U.S. Cl.
CPC .............. *B23K 26/53* (2015.10); *B23K 26/55* (2015.10); *B23K 2103/54* (2018.08)

(58) Field of Classification Search
CPC ........... B23K 26/0676; C03B 33/0222; C03B 33/091; C03B 33/093
See application file for complete search history.

(56) References Cited

U.S. PATENT DOCUMENTS

| | | | | |
|---|---|---|---|---|
| 10,661,384 | B2 * | 5/2020 | Kumkar | .............. G02B 27/0927 |
| 2015/0136743 | A1 * | 5/2015 | Hosseini | ............... C03B 33/091 |
| | | | | 219/121.61 |
| 2015/0165548 | A1 * | 6/2015 | Marjanovic | ........... C03B 33/091 |
| | | | | 219/121.73 |
| 2020/0054485 | A1 * | 2/2020 | Knox | ................... B23K 26/082 |
| 2020/0376603 | A1 * | 12/2020 | Ortner | ................ B23K 26/0613 |
| 2023/0036386 | A1 * | 2/2023 | Taylor | ................ B23K 26/0652 |
| 2023/0339042 | A1 * | 10/2023 | Leslie | .................... B23K 26/55 |
| 2024/0342827 | A1 * | 10/2024 | Flamm | ................. B23K 26/704 |

* cited by examiner

STRUCTURED DISCRETE BEAM FORMATION FOR CUTTING TRANSPARENT SUBSTRATES

This application claims priority to U.S. Provisional Patent Application Ser. No. 63/128,614, entitled "Laser Cutting of Sheet Substrates" and filed Dec. 21, 2020, the entire contents of which are hereby incorporated by reference.

TECHNICAL FIELD

The disclosure relates to laser cutting of substrates.

BACKGROUND

Lasers are often used to cut sheets of substrate material (e.g., glass) into smaller shapes to be used in various products, such as display screens of a cellular phone or glass disks used for magnetic media of a hard disk drive. In some examples, the lasers utilize continuous wave (also referred to as long-duration laser pulses) or short-pulsed lasers. The use of continuous wave operating within the thermal regime of the substrate results in reflow of molten material into the cut path. Short-pulsed lasers in the range of nanoseconds reduce thermal reflow but result in an undesirably wide cut path.

SUMMARY

The disclosure describes a laser cutting system utilizing diffractive optics and high power-density, ultra-short laser pulses. A series of ultra-short laser pulses in the range of pico-seconds or femto-seconds is used, with a relatively long time between pulses. This pulse delivery pattern causes the occurrence of several phenomena that materially weaken the substrate, including Coulomb explosion, plasma formation, shock waves, material modification, and thermal diffusion. Furthermore, optics create a structured pattern of discrete voxels in the substrate. Each voxel includes a high-power density region in which the Coulomb explosion occurs. Cracks form between the voxels, resulting in a relatively clean cut with relatively few edge defects.

In one example, a method includes emitting an ultra-short pulse laser beam from a laser source. The method also includes forming the laser beam into a plurality of discrete beams via an optical array, where intersecting discrete beams form a structured light pattern comprising a plurality of voxels. A first subset of the plurality of voxels define a line and a second subset of the plurality of voxels lie outside the line. The method also includes forming a plurality of voids in a substrate by aligning the structured light pattern onto the substrate, each voxel of the plurality of voxels forming a discrete void in the substrate, each void separated by the substrate. The method includes, after forming the plurality of voids in the substrate at a plurality of different positions, forming an article by separating one portion of the substrate from a base portion of the substrate.

These and other features and aspects of various examples may be understood in view of the following detailed discussion and accompanying drawings.

DETAILED DESCRIPTION

Figures 1A, 1B:
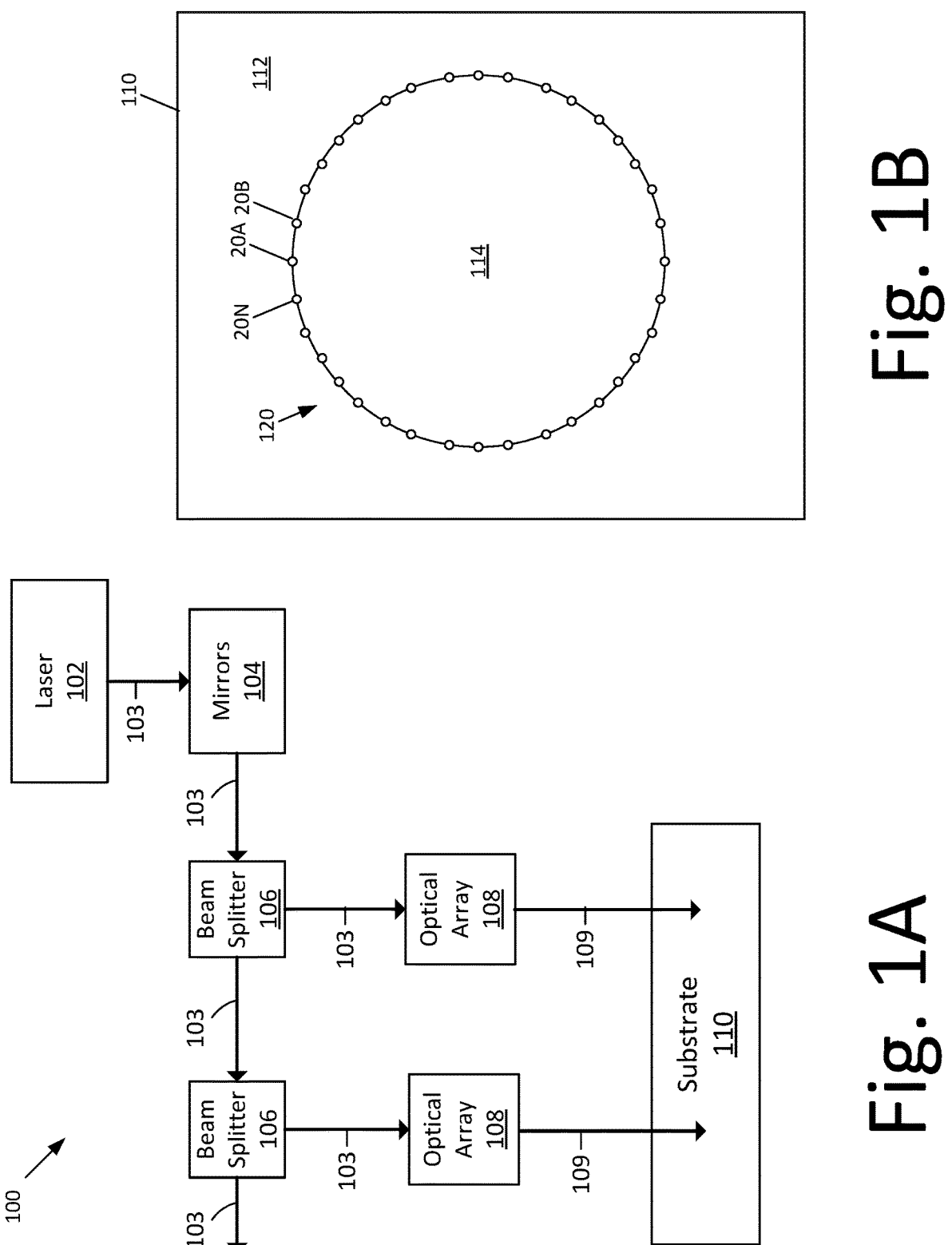
FIG. 1A is a schematic view of a laser cutting system, according to various aspects of the present disclosure.
FIG. 1B is a top view of the example substrate of FIG. 1A, in accordance with various aspects of the present disclosure.

FIG. 1A is a schematic view of a laser cutting system, according to various aspects of the present disclosure. FIG. 1B is a top view of the example substrate of FIG. 1A, in accordance with various aspects of the present disclosure.

Laser cutting system 100 includes laser 102, one or more mirrors 104, one or more beam splitters 106, one or more optical arrays 108, and substrate 110. In some examples, substrates 110 is a transparent or semi-transparent material, such as glass. Laser cutting system 100 is configured to cut substrate 110 into various articles, which may be used as display screens of a cellular phone or disks used for magnetic media of a hard disk drive.

Laser 102 is configured to emit one or more laser beams 103. Laser beam 103 is defined by a wavelength that is transparent or substantially transparent to substrate 106 in the thermal regime. That is, the material is transparent to the laser radiation and remains in its original state below the intensity threshold for nonlinear absorption. Laser 102 may be an ultra-short pulse laser that is configured to emit light in rapid pulses defined by a ultra-short pulse duration. For example, the pulse duration may be between approximately 100 femtoseconds to approximately 50 picoseconds. In one example, the power output of laser 102 is greater than 100 Watts, for example, 150 W, 200 W, or higher.

In some examples, laser 102 emits a single pulse with a given pulse duration (e.g., approximately 100 femtoseconds to approximately 50 picoseconds) followed by a relatively long time-period (e.g., approximately 1 microsecond to approximately 100 microseconds) before emitting another single pulse. In another example, laser 102 rapidly emits a burst of pulses (e.g., two, three, or more pulses) where each pulse in the burst is separated by approximately 1 nanosecond to approximately 50 nanoseconds. The pulse burst may have a burst duration of approximately 1 nanosecond to approximately 500 nanoseconds (e.g., if the pulse burst includes 10 pulses). Each burst of pulses is separated by a relatively long time-period (e.g., approximately 1 microsecond to approximately 100 microseconds) that is measured between the start of the first pulse of one pulse burst and the start of the first pulse of the next pulse burst.

Mirrors 104 direct the laser beam 103 from laser 102 to beam splitters 106. One or more of the mirrors 104 may be disposed on a gantry. Each beam splitter 106 redirects a portion of the laser beam 103 to a respective optical array 108.

Each optical array 108 forms a plurality of discrete beams 109 (shown schematically as a single line in FIG. 1) to create a structured light pattern within the substrate 110. For example, optical arrays 108 may include diffractive optics and/or a spatial light modulator configured form a plurality of light beams from a single light beam. In some examples, optical arrays 108 include narrow band filters, edge band filters, axicons, modified axicons, MEMS, micro lens arrays, electrostatic focusing optics, beam splitters, birefringent crystals and optics, polarization rotators, and frequency multipliers (e.g., frequency doublers).

Optical array 108 focuses discrete beams 109 into a structured light pattern within substrate 110. The structured light pattern includes a plurality of voxels at the each intersection of two discrete beams. The shape of each voxel is defined by the profile of the intersecting discrete beams 109. Because the laser beam pulse is ultra-short and the power is very high, substrate 110 experiences nonlinear absorption at each of the voxels of the structured light pattern. Nonlinear absorption causes a Coulomb explosion at each voxel, thus forming a void in substrate 110 within an area proximate each voxel. Each voxel is separated from an adjacent voxel by substrate 110. In other words, each voxel forms a discrete void that is separated by substrate 110 from an adjacent discrete void formed by a different voxel. The shape of the void is defined by the profile of the voxels. Examples of discrete beams 109 and voxels are shown in more detail in FIGS. 2-4.

As illustrated in FIG. 1B, each optical array creates a structured light pattern within substrate 110 at a plurality of positions 20A-20N (collectively, positions 20). For example, laser 102 emits a pulse or pulse burst while optical array 108 is aligned with substrate 110 at a first position (e.g., 20A), such that the voxels of the structured light pattern form voids in substrate 110, thereby weaking substrate 110 at that position. After emitting the pulse or pulse burst at position 20A, optical array 108 is translated relative to substrate 110 to an adjacent position 20B. For example, laser cutting system 100 may include a motor configured to move optical array 108 from one position to another position.

Laser 102 emits a pulse or pulse burst and optical array 108 generates a structured light pattern with substrate 110 at position 20B. The structured light pattern forms a void in substrate 110 at position 20B to weaken substrate 110 at position 20B. Similarly, optical array 108 is translated relative to substrate 110 to each of positions 20. At each position 20, laser 102 emits a pulse or pulse burst, thus creating the structured light pattern at each position 20 and forming voids in substrate 110 at each of the positions.

Positions 20 define the shape of an article 120 to be cut from substrate 110. While article 120 is circular in the example of FIG. 1B, article 120 may be any shape. In one example, optical array 108 moves in a circular path while substrate 110 is stationary, thus creating voids at each of positions 20. While optical array 108 is described as moving while substrate 110 is stationary, in some examples, substrate 110 may move while optical array 108 remains stationary, or substrate 110 and optical array 108 may both move, to create voids at positions 20 on substrate 110.

Optical array 108 or a portion of optical array 108 may be rotated from one position 20 to another adjacent position. For example, optical array 108 may include a polarization rotator that is rotated between different positions 20, which may change the polarization of laser beams 103 at different positions 20.

Article 120 is formed by separating a portion 114 of substrate 110 from base portion 112 of substrate 110. In some examples, article 120 may automatically separate from substrate 110 due to the voids and cracks formed in substrate 110. In one example, a mechanical process (e.g., applying a force) and/or thermal process (e.g., $CO_2$ laser heating) is performed to separate article 120 from substrate 110. Examples of article 120 include screens for mobile phones or other computing devices, media for hard disk drives.

Utilizing high-power, ultra-short laser pulses to create voids in substrate 110 may enable laser 102 to cut substrate 110 relatively quickly and cleanly compared to laser cutting techniques utilizing continuous wave lasers or nanosecond lasers. In contrast to continuous wave lasers which cause linear absorption of the laser energy and reflow of molten material in a cut path, and nanosecond lasers which have a relatively large cut path, the techniques of this disclosure may produce relatively narrow, clean cuts through the substrate, potentially reducing the edge defects of articles cut from substrate 110. Reducing the number of edge defects may reduce the time and/or amount of post-processing steps required to finish the article after separating the article from the substrate (e.g., by reducing the amount of edge polishing required).

Figure 2B:
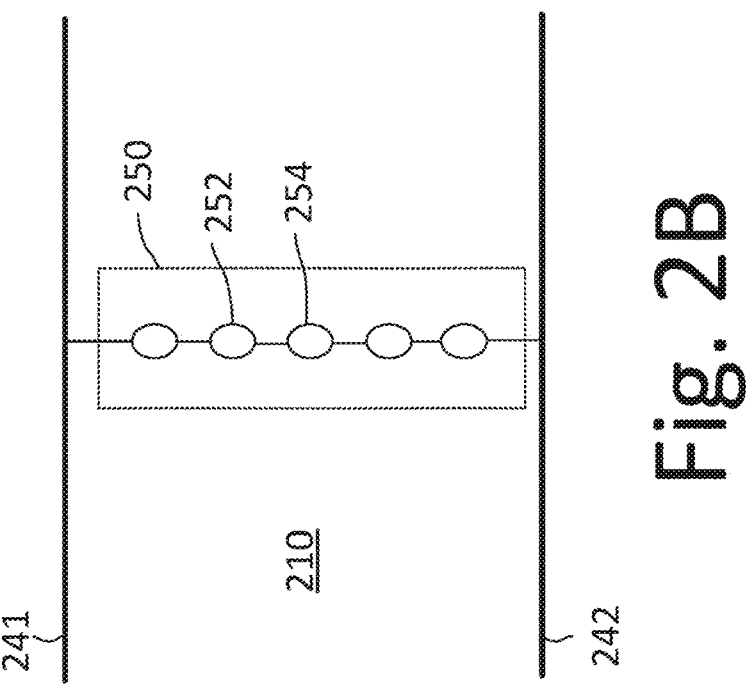
FIG. 2B is a cross-sectional view the structured light pattern of FIG. 2A in a substrate.
Figure 2A:
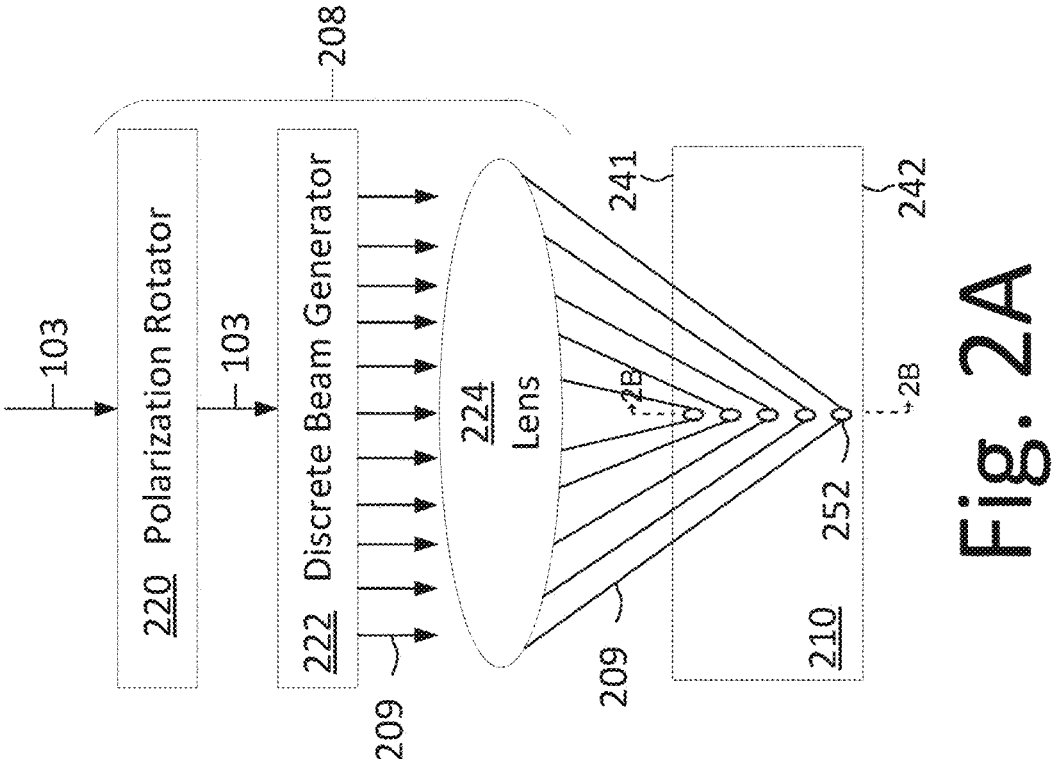
FIG. 2A is a schematic view of an example optical array and structured light pattern, according to various aspects of the present disclosure.

FIG. 2A is a schematic view of an example optical array and structured light pattern, according to various aspects of the present disclosure. FIG. 2B is a cross-sectional view the structured light pattern of FIG. 2A in a substrate. Optical array 208 is an example of optical array 108 of FIG. 1. Optical array 208 includes a polarization rotator 220, discrete beam generator 222, and lens 224. Optical array 208 may include other components not shown in FIG. 2, such as narrow band filters, edge band filters, axicons, modified axicons, MEMS, micro lens arrays, electrostatic focusing optics, beam splitters, birefringent crystals and optics, and/or frequency multipliers (e.g., frequency doublers).

Polarization rotator 220 is configured to rotate the polarization axis of laser beam 103, and thus the polarization direction of discrete beams 209. In some examples, stress formation within substrate 210 is controlled by polarization rotator 220. For example, the polarization direction of polarization rotator 220 may be chosen to create cracks 254 in substrate 210 in a preferred direction as further described below.

Discrete beam generator 222 is configured to form a plurality of discrete beams 209 from laser beam 103. Examples of discrete beam generator 222 include diffractive optics or a spatial light modulator.

Lens 224 focuses discrete beams 209 onto substrate 210 to create a structured light pattern 250. Structured light pattern 250 includes a plurality of voxels 252 formed by intersecting discrete beams 209. Each voxel is separated from an adjacent voxel by substrate 210. The shape of voxels 252 is defined by the profile of discrete beams 209. For example, voxels 252 may be approximately spherical, ellipsoidal, cylindrical, or tube-shaped, among other shapes. In the example illustrated in FIG. 2A, voxels 252 define a straight line through the thickness of substrate 210. For example, voxels 252 may form a vertical line that is approximately perpendicular to top surface 241 and/or bottom surface 242 of substrate 210.

In operation, optical array 208 forms discrete beams 209 and voxels 252 for each pulse of laser 102, such that substrate 210 experiences nonlinear absorption and Coulomb explosion at each voxel 252, thus creating a discrete void in substrate 210 at each voxel 252. As illustrated in FIG. 2B, the polarization of discrete beams 209 causes cracks 254 to form between adjacent voxels 252. In one example, the direction of cracks 254 is based on the polarization of discrete beams 209. For example, rotating polarization rotator 220 changes the polarization of direction beams 209, which may also change the direction of cracks 254. In the example of FIG. 2B, the direction of polarization rotator 220 is chosen to polarize discrete beams 209 to form vertical cracks 254 along the vertical line defined by voxels 252. Cracks 254 may further weaken substrate 210, which may enable an article to be removed from substrate 210 more easily and/or with fewer defects.

While FIGS. 2A and 2B illustrate discrete beam formation to create voxels and cracks at one position of substrate 210 (e.g., position 20A as illustrated in FIG. 1B), it should be understood that optical array 208 is translated relative to substrate 210 to cut substate 210 at a plurality of positions. Forming voxels 252 and cracks 254 at a plurality of different positions around the perimeter of an article may enable an article to be separated from substrate 210. The shape of the article is defined by the arrangement of voxel 252. For example, as shown in FIGS. 2A and 2B, the edge or perimeter of the article may be approximately vertical (e.g., approximately perpendicular to surfaces 241 and 242).

Figure 3B:
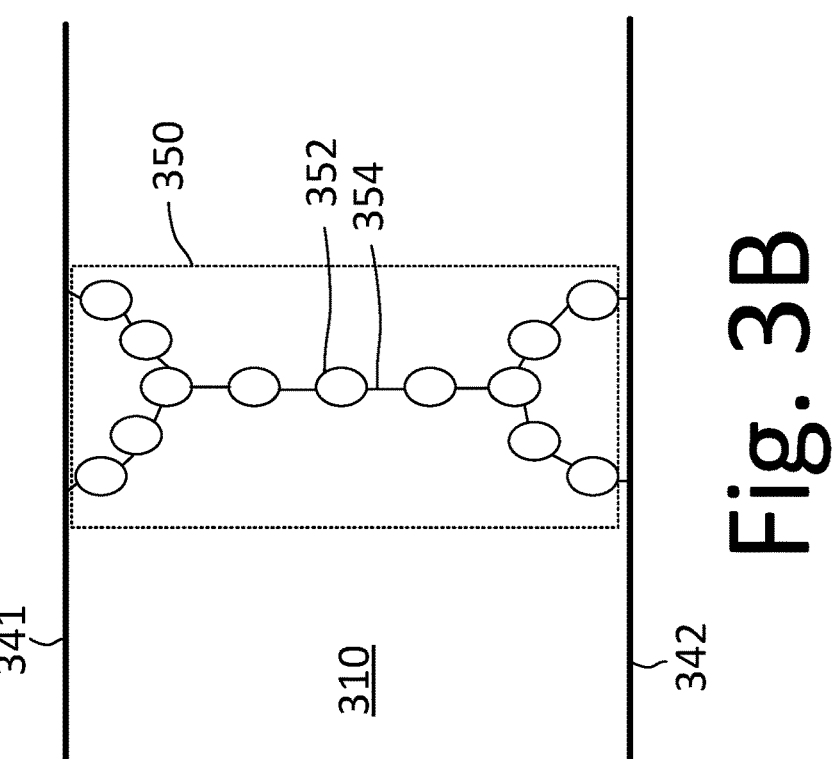
FIG. 3B is a top view the structured light pattern of FIG. 3A in a substrate.
Figure 3A:
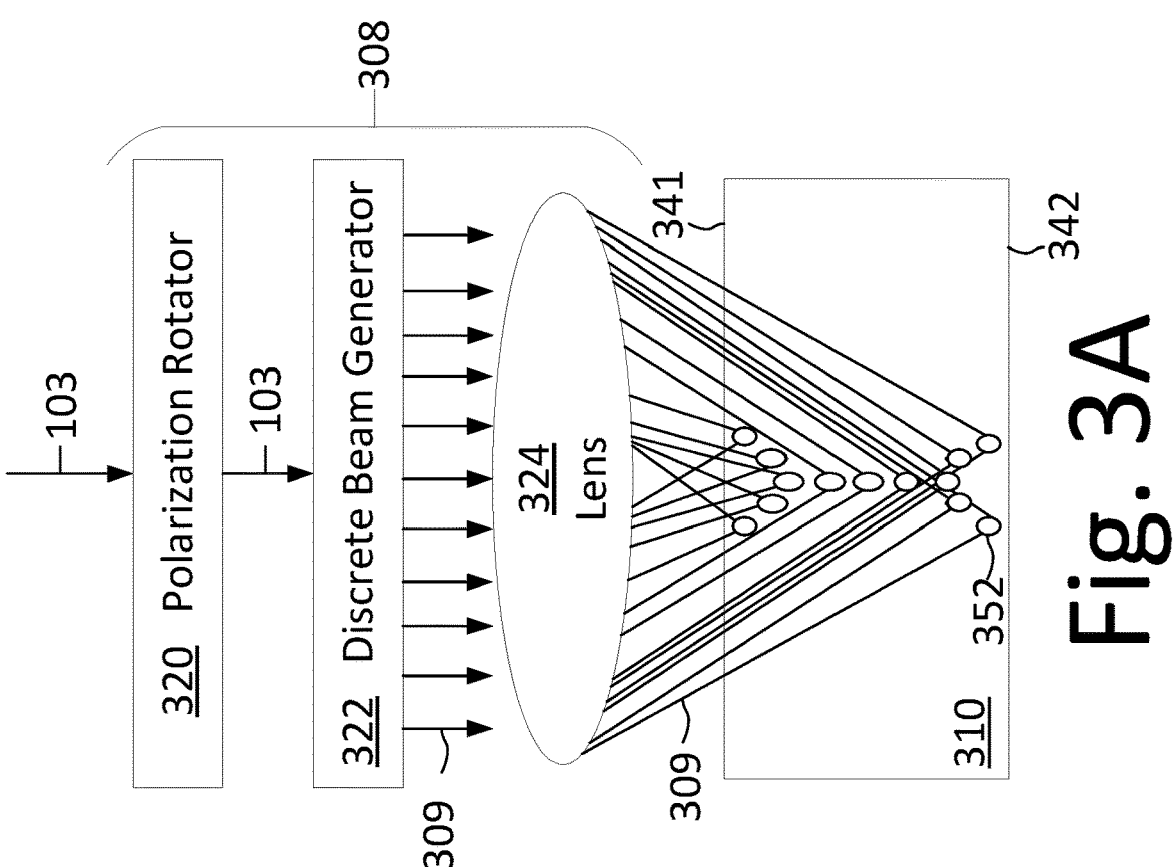
FIG. 3A is a schematic view of an example optical array and structured light pattern, according to various aspects of the present disclosure.

FIG. 3A is a schematic view of an example optical array and structured light pattern, according to various aspects of the present disclosure. FIG. 3B is a cross-sectional view the structured light pattern of FIG. 3A in a substrate. Optical array 308 is an example of optical array 108 of FIG. 1. Optical array 308 includes a polarization rotator 320, discrete beam generator 322, and lens 324. Optical array 308 may include other components not shown in FIG. 3, such as narrow band filters, edge band filters, axicons, modified axicons, MEMS, micro lens arrays, electrostatic focusing optics, beam splitters, birefringent crystals and optics, and/ or frequency multipliers (e.g., frequency doublers).

Polarization rotator 320 is configured to rotate the polarization axis of laser beam 103, and thus the polarization direction of discrete beams 309. As further described below, the polarization direction of polarization rotator 320 may be chosen to create cracks 354 in substrate 310 in a preferred direction.

Discrete beam generator 322 is configured to form a plurality of discrete beams 309 from laser beam 103. Examples of discrete beam generator 322 include diffractive optics or a spatial light modulator.

Lens 324 focuses discrete beams 309 onto substrate 310 to create a structured light pattern 350. Structured light pattern 350 includes a plurality of voxels 352 formed by intersecting discrete beams 309. Each voxel is separated from an adjacent voxel by substrate 310. The shape of voxels 352 is defined by the profile of discrete beams 309. For example, voxels 352 may be approximately spherical, ellipsoidal, cylindrical, or tube-shaped, among other shapes.

In the example illustrated in FIG. 3A, a first subset of voxels 352 define a vertical line through a portion of the thickness of substrate 310 and a second subset of voxels connect the vertical line to a top surface 341 or bottom surface 342 of substrate 310. In one example, the first subset of voxels are not linear with the second subset of voxels. That is, the second subset of voxels lie outside the line defined by the first subset of voxels. For example, the first subset of voxels may form a vertical edge of an article that is separated from substrate 210 while the second subset of voxels form a chamfer surface between the vertical edge and a horizontal top surface 341 (e.g., defining a first horizontal plane). In one example, a third subset of voxels form a chamfer surface connecting the vertical edge and a horizontal bottom surface 342 (e.g., defining a second horizontal plane). The second and/or third subset of voxels may form a straight line or an arc, such that the chamfer surfaces of the article may form a flat surface or curved surface, respectively, when the article is separated from substrate 310.

In operation, optical array 308 forms discrete beams 309 and voxels 352 for each pulse of laser 102, such that substrate 310 experiences nonlinear absorption and Coulomb explosion at each voxel 352, thus creating a discrete void in substrate 310 at each voxel 352. As illustrated in FIG. 3B, the polarization of discrete beams 309 causes cracks 354 to form between adjacent voxels 352. In one example, the direction of cracks 354 is based on the polarization of discrete beams 309. For example, rotating polarization rotator 320 changes the polarization of direction beams 309, which may also change the direction of cracks 354. In the example of FIG. 3B, the direction of polarization rotator 320 is chosen to polarize discrete beams 309 to form vertical cracks 354 along the vertical line defined by voxels 352. Cracks 354 may further weaken substrate 310, which may enable an article to be removed from substrate 310 more easily and/or with fewer defects.

While FIGS. 3A and 3B illustrate discrete beam formation to create voxels and cracks at one position of substrate 310 (e.g., position 20A as illustrated in FIG. 1B), it should be understood that optical array 308 is translated relative to substrate 310 to cut substate 310 at a plurality of positions. Forming voxels 352 and cracks 354 at a plurality of different positions around the perimeter of an article may enable an article to be separated from substrate 310.

The shape of the article is defined by the arrangement of voxel 352. For example, as shown in FIGS. 3A and 3B, the article may include an edge surface that is approximately vertical (e.g., approximately perpendicular to surfaces 341 and 342) and is formed by the first subset of voxels 352. In one example, a chamfered surface connecting the edge surface to the top surface 341 and/or bottom surface 342 is formed by a second subset of voxels 352.

Utilizing a structured light pattern 350 with a chamfering arrangement may enable the laser cutting system to chamfer the article at the same time the article is cut from substrate 310. Chamfering the top and/or bottom surfaces of the article while cutting the article from the substrate may reduce or eliminate the need for post-cutting chamfering processes (e.g., mechanical grinding), which may reduce the number of defects in the article and improve the quality of article, while potentially reducing the cost and/or time to manufacture the article.

Figure 4B:
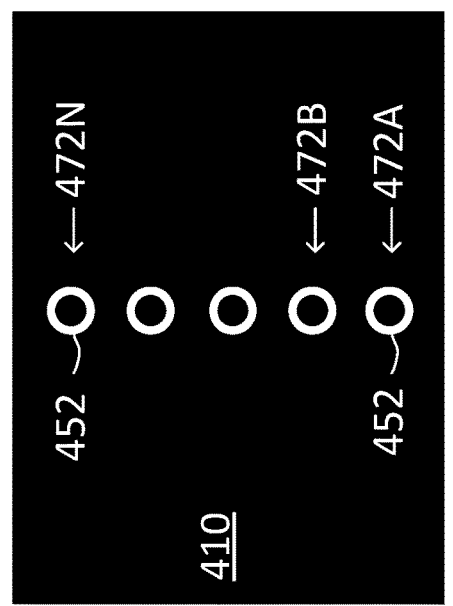
FIG. 4B is a top view of the example substrate of FIG. 4A.
Figure 4A:
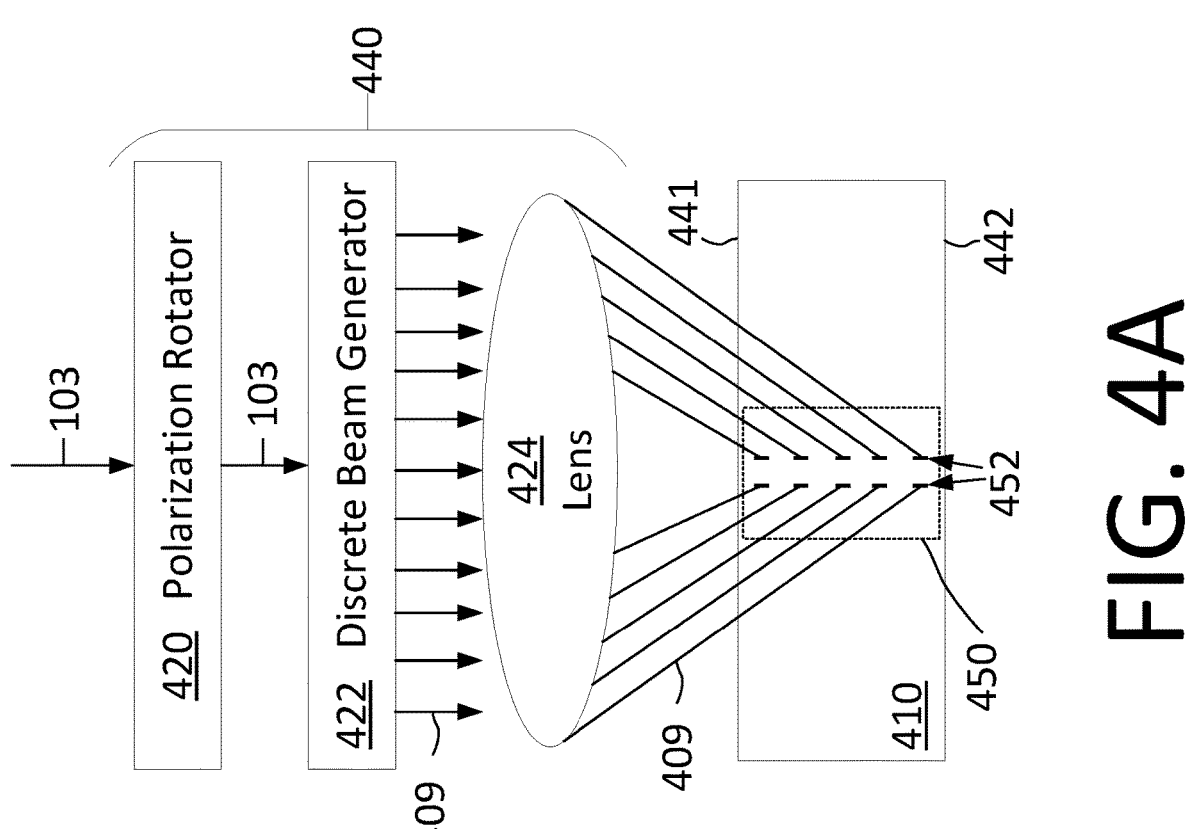
FIG. 4A is a schematic view of an example optical array and structured light pattern, according to various aspects of the present disclosure.

FIG. 4A is a schematic view of an example optical array and structured light pattern, according to various aspects of the present disclosure. FIG. 4B is a top-view of the example substrate of FIG. 4A. Optical array 408 is an example of optical array 108 of FIG. 1. Optical array 408 includes a polarization rotator 420, discrete beam generator 422, and lens 424. Optical array 408 may include other components not shown in FIG. 4, such as narrow band filters, edge band filters, axicons, modified axicons, MEMS, micro lens arrays, electrostatic focusing optics, beam splitters, birefringent crystals and optics, and/or frequency multipliers (e.g., frequency doublers).

Polarization rotator 420 is configured to rotate the polarization axis of laser beam 103, and thus the polarization direction of discrete beams 409. In some examples, stress formation within substrate 410 is controlled by polarization rotator 420. For example, the polarization direction of polarization rotator 420 may be chosen to create cracks in substrate 410 in a preferred direction as further described below.

Discrete beam generator 422 is configured to form a plurality of discrete beams 409 from laser beam 103. Examples of discrete beam generator 422 include diffractive optics or a spatial light modulator.

Lens 424 focuses discrete beams 409 onto substrate 410 to create a structured light pattern 450. Structured light pattern 450 includes a plurality of voxels 452 formed by intersecting discrete beams 409. Each voxel 452 is separated from an adjacent voxel by substrate 410. In the example illustrated in FIG. 4A, voxels 452 define a straight line through the thickness of substrate 410. For example, voxels 452 may form a vertical line that is approximately perpendicular to top surface 441 and/or bottom surface 442 of substrate 410.

As illustrated in FIG. 4B, each optical array creates a structured light pattern within substrate 410 at a plurality of positions 470A-470N (collectively, positions 470). For example, laser 102 emits a pulse or pulse burst while optical array 408 is aligned with substrate 410 at a first position (e.g., 470A), such that the voxels of the structured light pattern form voids in substrate 410, thereby weaking substrate 410 at that position. After emitting the pulse or pulse burst at position 470A, optical array 408 is translated relative to substrate 410 to an adjacent position 470B. For example, laser cutting system 400 may include a motor configured to move optical array 408 from one position to another position, such that laser cutting system 400 may form voids in substrate 410 at each of positions 470A-470N.

As some examples, the polarization of discrete beams 409 causes cracks to form between adjacent voxels 452. In one example, the direction of the cracks is based on the polarization of discrete beams 409. For example, rotating polarization rotator 420 changes the polarization of direction beams 409, which may also change the direction of the crack. In one example, the direction of polarization rotator 420 is chosen to polarize discrete beams 409 to form vertical cracks along the vertical line defined by voxels 452.

Figure 4D:
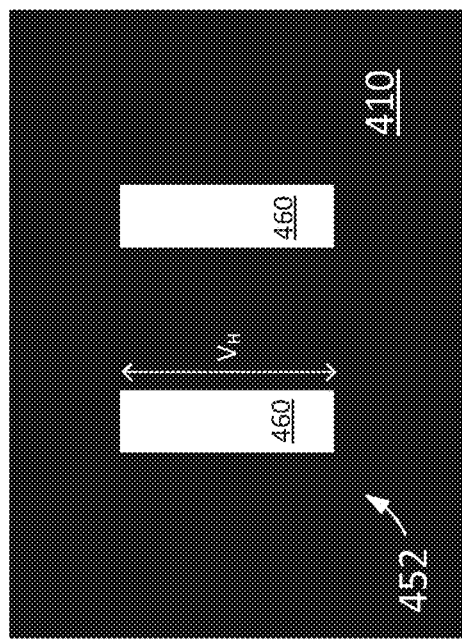
FIG. 4D is a cross-sectional view of an example voxel of FIG. 4A.
Figure 4C:
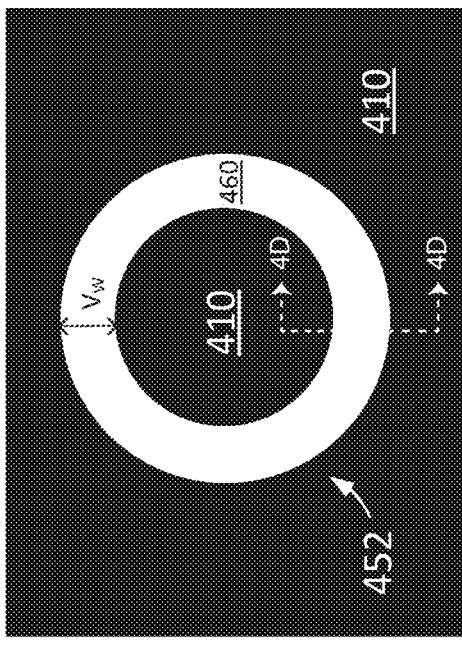
FIG. 4C is a top view of an example voxel of FIG. 4A.

FIG. 4C is a top view of the example substrate of FIGS. 4A and 4B. FIG. 4D is a cross-sectional view of the example substrate of FIGS. 4A and 4B. In the examples of FIGS. 4A-4D, voxels 452 are tube-shaped. The tube-shape of voxels 452 defines the void in substrate 410. For example, as shown in the top view of FIG. 4C, void 460 is defined by a ring in a horizontal plane that is parallel to a plane defined by the top surface 441 and/or a plane defined by bottom surface 442. Each void 460 is defined by a width $V_W$ and encircles a portion of substrate 410 within the horizontal plane, as shown in FIG. 4C. Void 460 forms a ring throughout the height $V_H$ of void 460.

While tube-shaped voxels 452 are illustrated in a straight line throughout the thickness of substrate 410, in some examples, voxels 452 may not be linear through the entire thickness of substrate 410. For example, tube-shaped voxels 452 may include a first subset of voxels that are linear through a portion of substrate 410 and another subset of voxels that are not linear with the first subset of voxels, as previously shown in FIGS. 3A-3B. In this way, voxels 452 may define one or more chamfer surfaces between an edge surface of the article and a top surface and/or bottom surface of the article.

Figure 5:
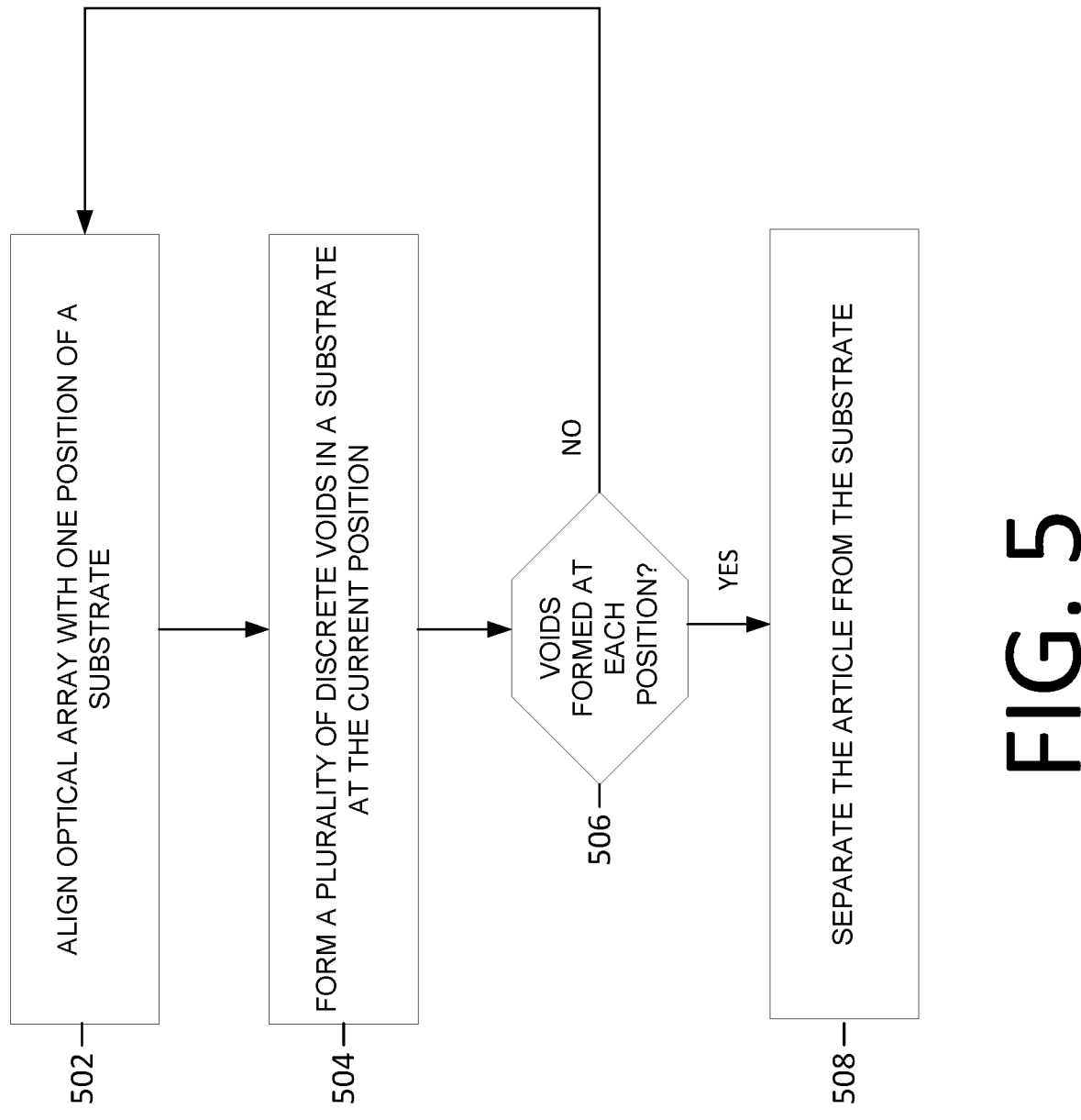
FIG. 5 is a flowchart illustrating example operations of a laser cutting system, according to various aspects of the present disclosure.

FIG. 5 is a flowchart illustrating example operations of a laser cutting system, according to various aspects of the present disclosure. The flowchart of FIG. 5 is described with reference to laser cutting system 100 of FIG. 1.

Optical array 108 is aligned with one position of substrate 110 (502). For example, a motor of laser cutting system 100 may move optical array 108 and/or substrate 110 to align optical array 108 with a first position of substrate 110.

Laser cutting system 100 forms a plurality of discrete voids in substrate 110 at the current position (504). For example, laser 102 emits an ultra-short pulse or burst of pulses of laser beam 103. Optical array 108 forms a plurality of discrete beams 109 from laser beam 103 for each pulse of laser 102. Optical array 108 focuses discrete beams 109 into a structured light pattern within substrate 110 to form a plurality of voxels within substrate 110, where each voxel is separated from an adjacent voxel by substrate 110. For example, a voxel may be formed at the each intersection of two discrete beams 109. Because the laser beam pulse is ultra-short and the power is very high, substrate 110 experiences nonlinear absorption at each of the voxels of the structured light pattern. Nonlinear absorption causes a Coulomb explosion at each voxel, thus forming a void in substrate 110 within an area proximate each voxel. In this way, each voxel forms a discrete void that is separate from another void by substrate 110.

Laser cutting system 100 may also form cracks within substrate 110 at each position 20. For example, a polarization rotator may polarize discrete beams 109 to cause cracks between each voxel 150. Creating a plurality of voids at each position 20 and creating a crack between adjacent voids may weaken substrate 110 at each position 20.

If voids have not been formed at each position in the substrate (506, "NO" path), optical array 108 is translated relative to substrate 110 to align optical array 108 at the next position (return to 502). Upon forming voids at each position of the substrate 110 (506, "YES" path), article 120 is separated from substrate 110 (508). Article 120 may be separated from substrate 110 using a mechanical process (e.g., applying a force) or a thermal process (e.g., CO2 laser heating).

Various examples have been presented for the purpose of illustration and description. These and other examples are within the scope of the following claims.

What is claimed is:

1. A method comprising:

emitting an ultra-short pulse laser beam from a laser source;

forming the laser beam into a plurality of discrete beams via an optical array, wherein intersecting discrete beams form a structured light pattern comprising a plurality of voxels at intersections of the intersecting discrete beams, a first subset of the plurality of voxels defining a line and a second subset of the plurality of voxels lying outside the line;

forming a plurality of voids in a substrate by aligning the structured light pattern onto the substrate, each voxel of the plurality of voxels of the aligned structured light pattern forming a discrete void in the substrate, each void separated by unmodified portions of the substrate, wherein the intersecting discrete beams intersect within the substrate to form the plurality of voids at the plurality of voxels; and after forming the plurality of voids in the substrate at a plurality of different positions, forming an article by separating one portion of the substrate from a base portion of the substrate.

2. The method of claim 1, wherein the article includes an edge surface defined by the line.

3. The method of claim 2, wherein the article includes a top surface defining a horizontal plane, wherein the edge surface is perpendicular to the horizontal plane, and wherein a chamfer surface connecting the top surface and the edge surface is defined by the second subset of the plurality of voxels.

4. The method of claim 3, wherein the chamfer surface is a first chamfer surface, wherein the plurality of discrete beams form a third subset of voxels lying outside the line, and a second chamfer surface connecting a bottom surface of the article and the edge surface is defined by the third subset of voxels.

5. The method of claim 1, further comprising translating the optical array relative to the substrate.

6. The method of claim 5, further comprising rotating a polarization of the laser beam by rotating a polarization rotator of the optical array.

7. The method of claim 1, wherein the optics array includes a spatial light modulator or diffractive optics that is configured to form the plurality of discrete beams from the laser beam.

8. The method of claim 1, further comprising:
translating the optical array relative to the substrate in a circular path defined by a plurality of positions; and
forming a respective plurality of voids at each position of the plurality of positions.

9. A system, comprising:
a laser source configured to emit an ultra-short pulse laser beam;
an optical array configured to form the laser beam into a plurality of discrete beams; and
a lens configured to focus the plurality of discrete beams into a structured light pattern, intersecting discrete beams forming a structured light pattern comprising a plurality of voxels at intersections of the intersecting discrete beams, a first subset of the plurality of voxels defining a line and a second subset of the plurality of voxels lying outside the line, the structured light pattern being aligned onto a substrate to form a plurality of voids in a substrate, each voxel of the plurality of voxels forming a discrete void in the substrate, each void separated by unmodified portions of the substrate, wherein an article is formed by separating one portion of the substrate from a base portion of the substrate after forming the plurality of voids in the substrate at a plurality of different positions.

10. The system of claim 9, wherein the article includes an edge surface defined by the line.

11. The system of claim 10, wherein the article includes a top surface defining a horizontal plane, wherein the edge surface is perpendicular to the horizontal plane, and wherein a chamfer surface connecting the top surface and the edge surface is defined by the second subset of the plurality of voxels.

12. The system of claim 11, wherein the chamfer surface is a first chamfer surface, wherein the plurality of discrete beams form a third subset of voxels lying outside the line, and a second chamfer surface connecting a bottom surface of the article and the edge surface is defined by the third subset of voxels.

13. The system of claim 9, further comprising a motor configured to move the optical array to translate the optical array relative to the substrate.

14. The system of claim 13, further comprising a polarization rotator configured to rotate a polarization of the laser beam.

15. The system of claim 9, the optics array including a spatial light modulator or diffractive optics that is configured to form the plurality of discrete beams from the laser beam.

16. The system of claim 9, further comprising:
a motor configured to move the optical array to translate the optical array relative to the substrate in a circular path defined by a plurality of positions,
wherein a respective plurality of voids is formed at each position of the plurality of positions.

* * * * *